United States Patent
Jing et al.

(10) Patent No.: US 11,999,348 B2
(45) Date of Patent: Jun. 4, 2024

(54) ADAPTIVE BRAKE MODE SELECTION

(71) Applicant: TUSIMPLE, INC., San Diego, CA (US)

(72) Inventors: Junbo Jing, San Diego, CA (US); Arda Kurt, San Diego, CA (US); Chasen Sherman, San Diego, CA (US); Tianqu Shao, San Diego, CA (US); Haoming Sun, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 495 days.

(21) Appl. No.: 16/773,541

(22) Filed: Jan. 27, 2020

(65) Prior Publication Data

US 2021/0229668 A1 Jul. 29, 2021

(51) Int. Cl.
*B60W 30/18* (2012.01)
*B60W 10/06* (2006.01)
(Continued)

(52) U.S. Cl.
CPC ...... *B60W 30/18136* (2013.01); *B60W 10/06* (2013.01); *B60W 10/18* (2013.01);
(Continued)

(58) Field of Classification Search
CPC ........ B60G 2600/1877; B60G 2600/70; B60L 2260/42; B60W 2050/0088; B60W 30/14;
(Continued)

(56) References Cited

U.S. PATENT DOCUMENTS

| 5,231,896 A * | 8/1993 | Kota .................... F02D 9/06 477/118 |
| 6,419,609 B1 * | 7/2002 | Lechner .............. F02D 41/1497 477/110 |

(Continued)

FOREIGN PATENT DOCUMENTS

| DE | 102016221622 A1 * | 5/2018 | ............ B60W 10/30 |
| DE | 102016221622 A1 | 5/2018 | |

(Continued)

OTHER PUBLICATIONS

Ta-Hsin Li, On Exponentially Weighted Recursive Least Squares for Estimating Time-Varying Parameters, Dec. 9, 2003, (Year: 2003).*

(Continued)

*Primary Examiner* — Abby Y Lin
*Assistant Examiner* — Karston G. Evans
(74) *Attorney, Agent, or Firm* — Perkins Coie LLP

(57) ABSTRACT

Methods, systems, and devices related to a method of controlling an autonomous vehicle, in particular, an autonomous diesel-engine truck are disclosed. In one example aspect, the method includes determining an available engine brake torque generation mechanism for reducing a current speed of the autonomous vehicle to a lower speed and selecting a brake mode corresponding to the engine brake torque availability. In case a rate of speed reduction is equal to or smaller than a threshold, the brake mode includes only an engine brake in which engine exhaust valve opening is adjusted for reducing the current speed. The threshold determined in part based on the available engine brake torque, gear position of the transmission, and the online estimated vehicle longitudinal dynamic model. In case the rate of speed reduction is greater than the threshold, the
(Continued)

500

[ determining, using an adaptive model of the autonomous vehicle, an available engine torque for reducing a current speed of the autonomous vehicle to a lower speed ] — 501

[ selecting a brake mode corresponding to the available engine brake torque ] — 503 brake mode incudes a combination of the engine brake and the foundation brake.

17 Claims, 6 Drawing Sheets

(51) Int. Cl.
  *B60W 10/18* (2012.01)
  *B60W 60/00* (2020.01)
  *F02D 9/06* (2006.01)
(52) U.S. Cl.
  CPC ............ *B60W 60/0025* (2020.02); *F02D 9/06* (2013.01); *B60W 2510/0657* (2013.01); *B60W 2510/10* (2013.01); *B60W 2520/10* (2013.01); *B60W 2520/28* (2013.01); *B60W 2710/06* (2013.01); *B60W 2710/18* (2013.01); *F02D 2200/1006* (2013.01)
(58) Field of Classification Search
  CPC ......... B60W 10/18; B60W 2510/0657; B60W 2710/18; B60T 2201/02; F02D 9/06
  See application file for complete search history.

(56) References Cited

U.S. PATENT DOCUMENTS

| | | | | |
|---|---|---|---|---|
| 7,324,888 | B1 * | 1/2008 | Stotsky | ............... F02D 41/1498 701/101 |
| 2002/0055411 | A1 * | 5/2002 | Yoshiaki | ............... B60W 30/19 477/107 |
| 2007/0192010 | A1 * | 8/2007 | Carlstrom | ....... B60W 30/18136 701/53 |
| 2009/0187331 | A1 * | 7/2009 | Olsson | ...................... F02D 9/06 701/112 |
| 2013/0133965 | A1 * | 5/2013 | Books | ............. B60W 30/18136 180/165 |
| 2014/0122020 | A1 * | 5/2014 | Kowalkowski | ......... G06F 17/18 702/179 |
| 2014/0200780 | A1 * | 7/2014 | Watanabe | ............. B60T 8/1706 701/68 |
| 2015/0040859 | A1 * | 2/2015 | Scavone | ............... F02D 41/145 123/323 |
| 2016/0129894 | A1 * | 5/2016 | Singh | ...................... B60T 8/176 701/1 |
| 2018/0050697 | A1 * | 2/2018 | Kuszmaul | ............... G01S 13/93 |
| 2018/0162394 | A1 * | 6/2018 | Kamiya | ............ B60W 30/0953 |
| 2019/0378039 | A1 * | 12/2019 | Zamanzad Gavidel | ..................... G06N 3/006 |
| 2020/0055500 | A1 * | 2/2020 | Meyer | ................. B60T 8/17558 |

FOREIGN PATENT DOCUMENTS

| | | |
|---|---|---|
| WO | 2019241307 A2 | 12/2019 |
| WO | WO-2019241307 A2 * | 12/2019 .......... B60W 30/143 |

OTHER PUBLICATIONS

Lu, X., et al., "Longitudinal Control Design and Experiment for Heavy-Duty Trucks," 2003 IEEE Proceedings of the American Control Conference, pp. 46-41 (Year: 2003).*

Stotsky, A., "Data-Driven Algorithms for Engine Friction Estimation," 2006 IEEE International Conference on Control Applications, pp. 521-526 (Year: 2006).*

Extended European Search Report for European Patent Application No. 21153542.2, dated Jun. 22, 2021 (9 pages).

* cited by examiner

ADAPTIVE BRAKE MODE SELECTION

TECHNICAL FIELD

This patent document relates to autonomous vehicles and, in particular, to brake mode selection of diesel-engine autonomous trucks.

BACKGROUND

Autonomous vehicles, also known as self-driving vehicles, are vehicles capable of sensing the environment and moving with little or no human input. Long distance trucks may be at the forefront of adopting and implementing such technology. With a fleet of autonomous trucks on the road, it may be important to ensure the performance and safety of such trucks.

SUMMARY

This document discloses embodiments related to methods, devices, and systems that provide, via optimal use of the engine brake, smooth deceleration for autonomous vehicles, particularly heavy-duty diesel engine trucks, while ensuring that sufficient deceleration power is applied to achieve desired speeds.

One example aspect of the disclosed embodiments relates to a method of controlling a diesel-engine autonomous truck. The method includes determining, using an adaptive model of the autonomous vehicle that adaptively adjusts model parameters while the autonomous vehicle is in operation, an available engine brake torque for reducing a current speed of the autonomous vehicle to a lower speed, and selecting a brake mode corresponding to the available engine brake torque and a rate of speed reduction. In case that the rate of speed reduction is equal to or smaller than a threshold, the brake mode is an engine brake in which engine exhaust valve opening is adjusted to generate a brake torque for reducing the current speed. The threshold is determined in part based on the available engine brake torque. In case the rate of speed reduction is greater than the threshold, the brake mode is a combination of the engine brake and the foundation brake.

Another example aspect of the disclosed embodiments relates to an autonomous diesel-engine vehicle. The vehicle includes a monitor system configured to measure vehicle states of the autonomous vehicle and a control system in communication with the monitor system to receive the measured vehicle states. The control system includes a processor that is configured to determine, using an adaptive model of the autonomous vehicle that adaptively adjusts model parameters while the autonomous vehicle is in operation, an available engine brake torque for reducing a current speed of the autonomous vehicle to a lower speed, and select a brake mode corresponding to the available engine brake torque and a rate of speed reduction. In case that the rate of speed reduction is equal to or smaller than a threshold, the brake mode is an engine brake in which engine exhaust valve opening is adjusted to generate a brake torque for reducing the current speed, the threshold determined in part based on the available engine brake torque. In case the rate of speed reduction is greater than the threshold, the brake mode is a combination of the engine brake and the foundation brake.

Yet another example aspect of the disclosed embodiments relates to a non-transitory computer readable storage medium. The non-transitory computer readable storage medium stores computer readable instructions configured to perform a method that includes determining, using an adaptive model of the autonomous vehicle that adaptively adjusts model parameters while the autonomous vehicle is in operation, an available engine brake torque for reducing a current speed of the autonomous vehicle to a lower speed; and selecting a brake mode corresponding to the available engine brake torque and a rate of speed reduction. In case that the rate of speed reduction is equal to or smaller than a threshold, the brake mode is an engine brake in which engine exhaust valve opening is adjusted to generate a brake torque for reducing the current speed. The threshold can be determined in part based on the available engine brake torque. In case the rate of speed reduction is greater than the threshold, the brake mode is a combination of the engine brake and a foundation brake The details of one or more implementations are set forth in the accompanying attachments, the drawings, and the description below. Other features will be apparent from the description and drawings, and from the claims.

DETAILED DESCRIPTION

Figure 1:
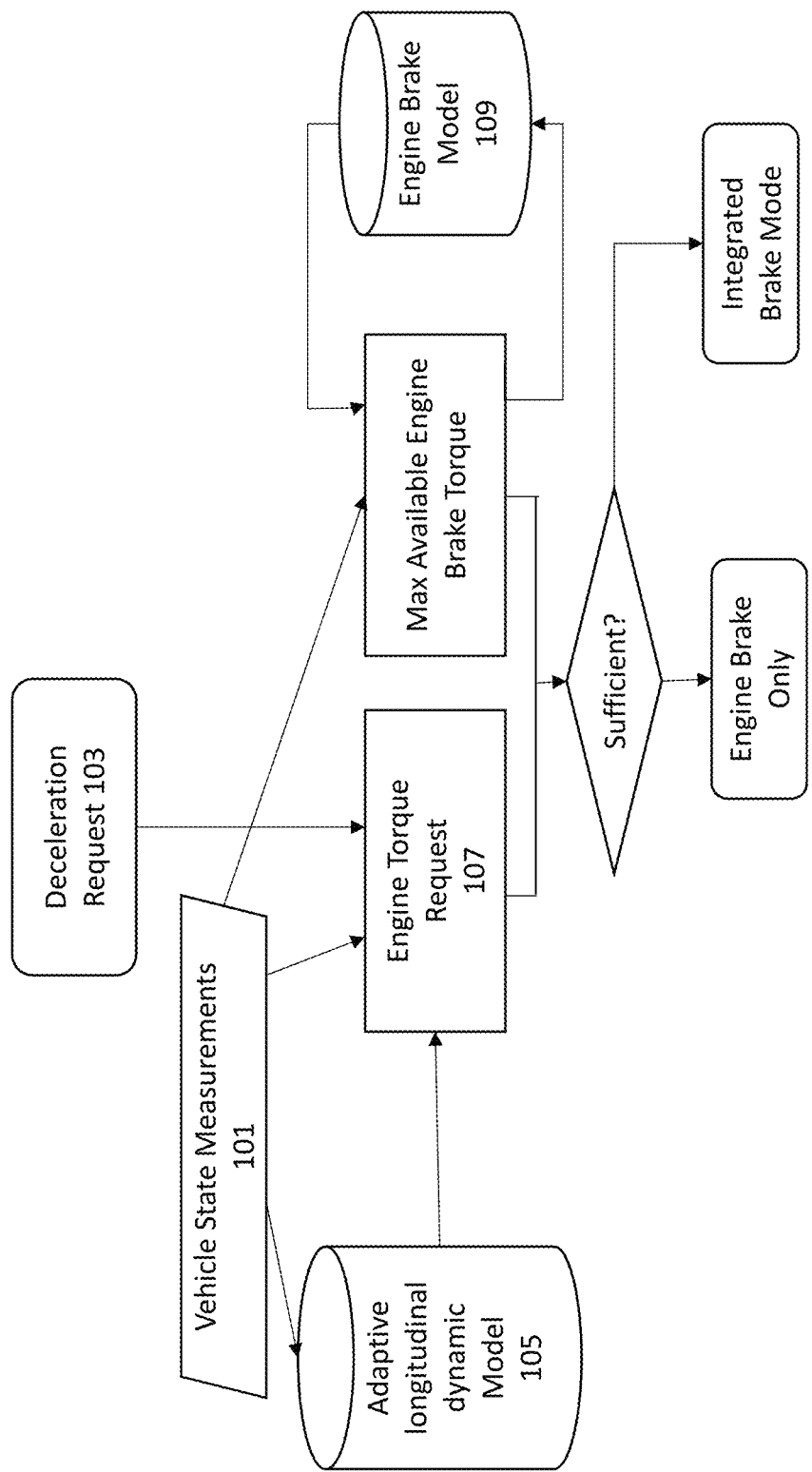
FIG. 1 illustrates an example logic flow of a vehicle control system in accordance with the present technology.

An engine brake (also referred to as Jake Brake or Compression Brake) is a negative torque generation mechanism specialized to diesel engines, particularly heavy-duty diesel engines. As compared to the positive engine torque generation process, in which energy is released from the compression ignited air-fuel mixture into the kinetic movement of engine pistons, the negative torque generation from an engine brake works by converting the vehicle kinetic energy through engine pistons into the potential energy stored in compressed air, which is then released outside the vehicle through the exhaust system. Therefore, the occurrence of the engine brake and the amount of engine brake torque is controlled by the engine exhaust valve opening that determines how much compressed air energy in the cylinders is not returned to the pistons kinetics, resulting in a controlled amount of negative engine torque generation. Because the cycle of exhaust valve closing and opening occurs at every compression cycle, an equivalent amount of exhaust valve opening is obtained by adjusting the Variable Camshaft Timing (VCT), which changes the amount of overlapping period between inlet valve opening and exhaust valve opening. Either mechanical or electrical mechanism can be used to adjust the VCT, but the latter provides faster transient response and higher degree of freedom. Additionally, the amount of engine brake torque can be discretely varied by deactivating a selected number of cylinders. For example, for a six-cylinder engine, engine brake can be generated through 2, 4, or 6 cylinders in manual driving, which corresponds to 33%, 67%, and 100% peak engine brake torque. Here, the number of cylinders is an even number so as to maintain the engine internal balance.

As compared to foundation brakes, engine brakes provide a smoother deceleration process, but the deceleration force may not be sufficient to reach the desired speed in a short amount of time. Conventionally, for autonomous vehicles, an offline engine brake response model (e.g., a rule-based finite state machine) can be constructed to determine behavior of the engine brake system using data a priori knowledge about the vehicle. However, many system response properties, such as real road conditions, tire responses, are not known a priori. Many factors, such as weather, friction, or vehicle health conditions, may not have been measured and thus remain unmodeled. Furthermore, offline engine brake response models may not be applicable to heavy-duty autonomous trucks due to many variations of the truck conditions. For example, the weight of the truck largely depends on the load that the truck carries. Heavy-duty trucks often travel on alternative routes to avoid introducing noise or damages to populated towns, thus the road situations for heavy truck can be very different as compared to regular automobiles. Due to the static nature of offline models, they can be overly conservative on engine brake usage, yet still lack guaranteed safety since they do not compensate for vehicle and environment condition variances.

The techniques disclosed herein can be implemented in various embodiments to make safe decisions on the use of engine brake for diesel-engine autonomous driving trucks, thereby maximizing smoothness in vehicle deceleration and to reducing system wear and tear. The use of engine brakes brings the advantage of smooth motion, foundation brake preservation, and reduced fuel consumption. The disclosed techniques can be implemented as a vehicle control system that is designed to use as much engine brake as possible, while ensuring sufficient deceleration force is applied. In particular, an online brake mode selection model (for example, a model that can adaptively adjust its parameters while the vehicle is in operation) can be implemented to choose between pure engine brake usage and/or integrated brake usage based on the amount of deceleration needed. For safety and efficiency reasons, in autonomous driving, accurate decisions should be made instantaneously when deceleration commands are given, with no room for trial-and-error or iterations on the decisions. Therefore, the control system must have full awareness of the vehicle's capability and consistently monitor the longitudinal dynamic response variations under changing load and environment conditions.

FIG. 1 illustrates an example logic flow of a vehicle control system in accordance with the present technology. Based on the mechanism and properties of engine brake, the amount of negative torque that can be achieved depends on the vehicle state (e.g., when there is no fuel injection, or no throttle command). For example, when transmission is neither preparing for a gear shift nor during a gear shift, the desired negative torque can be generated. As another example, the desired negative torque can be obtained when engine speed is sufficiently high (>850 rpm). Thus, the control system performs vehicle state measurements 101 to determine whether the engine brake can be applied.

Figure 2:
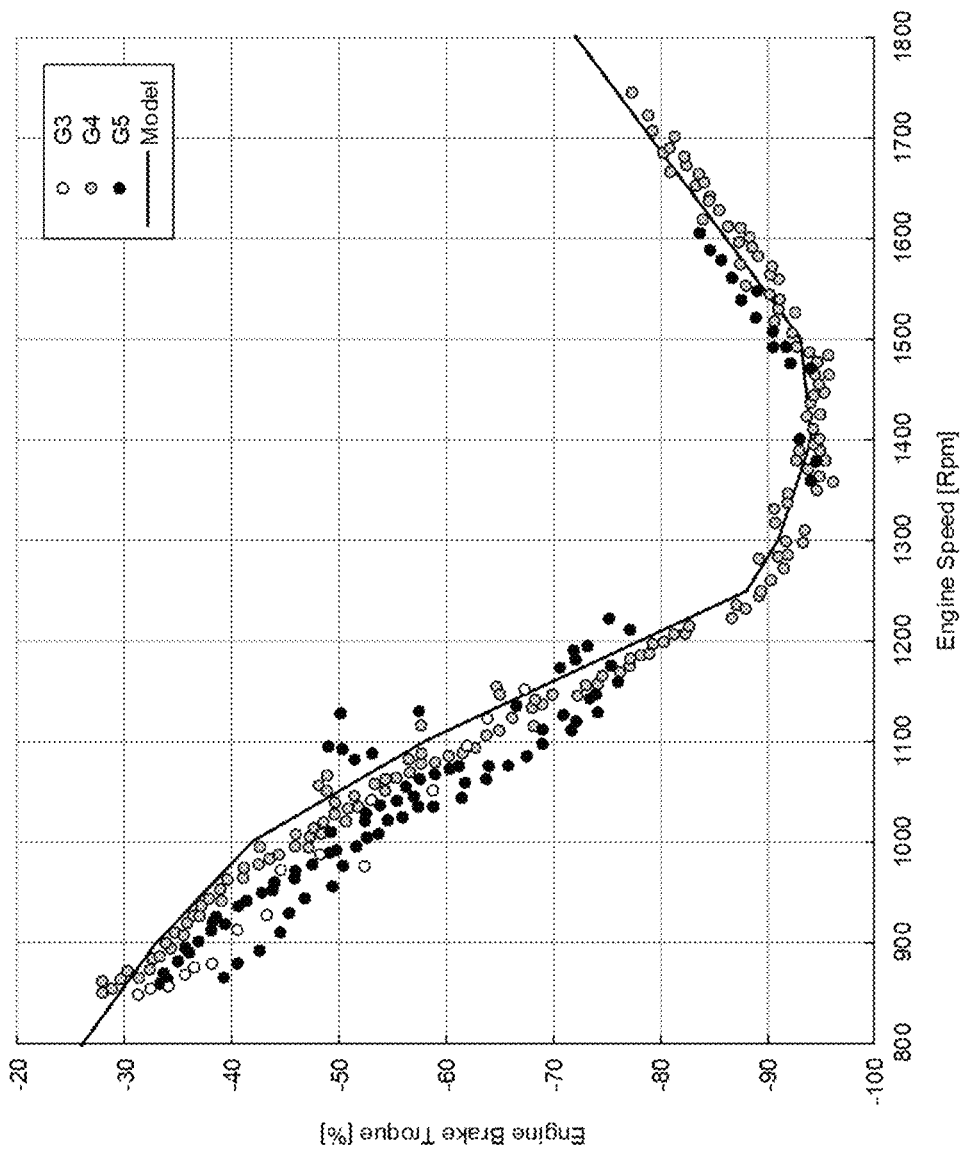
FIG. 2 illustrates an example plot of engine brake torque with respect to engine speed in accordance with the present technology.

Once the vehicle state satisfies certain conditions, a non-zero engine torque request 107 can be sent to the control system. The camshaft timing starts to change to allow the exhaust valve to open. The process can take a few seconds to reach to allow the exhaust valve to fully open. The engine brake then reaches a saturated state, in which the full-capacity engine brake torque relies on air volume and intake efficiency. The torque can be simplified to a function with respect to engine speed such as shown in the example below:

Engine Speed in Revolutions Per Minute=[800, 900, 1000, 1100, 1150, 1200, 1250, 1300, 1400, 1500, 1600, 1900];

Engine Brake Torque in Percentage=[−26, −33, −42, −58, −68, −78, −88, −91, −94, −93, −86, −65];

FIG. 2 illustrates an example plot of engine brake torque with respect to engine speed based on the above engine speed and engine brake torque. The dots shown in FIG. 2 represent data collected from different models of diesel engines. For example, as shown in FIG. 2, the black dots represent data collected from the Diesel QSK23 G5 model, the grey dots represent data collected from the G4 model, and white dots represent data collected from the G3 model. Based on the function described above, an engine brake capacity model (shown as the solid line) can be determined accordingly. In some embodiments, the engine brake capacity model is generated based on data collected when the engine brake is electronically requested as the control usage in autonomous driving. In some embodiments, electronic restrictions can be released to the maximum amount of exhaust valve opening based on conditions such as gear and engine speed. The control system can then use the engine brake capacity model to determine which brake mode can be used.

Figure 3:
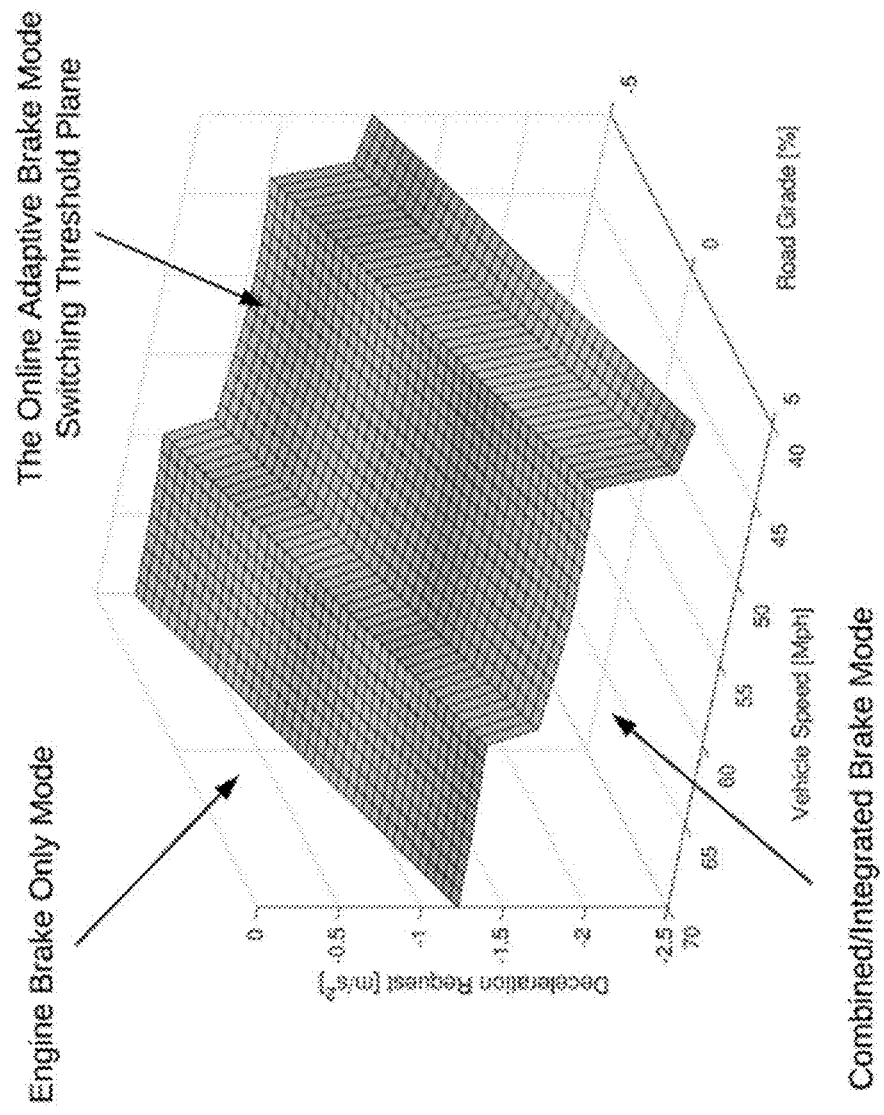
FIG. 3 illustrates an example plot indicating an adaptive switching threshold plane from the exclusive engine brake mode to the combined/integrated brake mode, influenced by main factors of vehicle speed, road grade, and/or gear shift in accordance with the present technology.

Referring back to FIG. 1, in some embodiments, the control system can include a vehicle backward longitudinal dynamic model 105. When the system receives a deceleration request 103, the model 105 can convert the deceleration request 103 based on vehicle state measurements 101 into an engine torque request 107. The control system also includes an engine brake model 109 to determine the current max available engine brake torque based on the vehicle state measurements. The control system then proceeds to compare the requested torque with the maximum available engine brake torque to determine whether sufficient deceleration can be provided by using the engine brake only or an integrated brake mode using multiple brakes (e.g., the engine brake and the hydraulic brake). In some embodiments, based on the vehicle state measurement 101, the engine brake can be used exclusively when the difference between a target speed of the deceleration request and the driving speed of the truck does not exceed a threshold. The threshold can be determined at least in part based on the maximum available engine brake torque, and the estimated vehicle longitudinal dynamic torque response model. When the difference gets larger, the control system can switch to a combined/integrated brake mode to ensure sufficient braking power for the safety of the vehicle. FIG. 3 illustrates an example plot indicating an adaptive switching threshold plane from the exclusive engine brake mode to the combined/integrated brake mode, influenced by main factors of vehicle speed, road grade, and/or gear shift in accordance with the present technology.

As discussed above, the engine cylinder exhaust valves do not open immediately to maximum, and the generated engine brake torque does not immediately jump onto the saturated line. Thus, an exhaust valve opening model can be constructed to estimate instantaneous engine brake torque availability while the exhaust valve cam timing is being changed. In some embodiments, the exhaust valve opening model can be constructed through empirical fitting. The process can start from identifying saturated engine brake data (e.g., data on the engine brake torque capacity curve) and unsaturated engine brake data (e.g., data when the exhaust valve timing is still changing).

In some embodiments, the exhaust valve opening time is reset each time when engine brake is deactivated by the violation of any generation conditions discussed above. The opening time also stops accumulating when the engine brake has been saturated onto the capacity curve. In some embodiments, separate empirical fitting models are denoted as Level 2 exhaust valve opening rate and Level 3 opening rate model. These separated models are fitted for the isolated Level 2 and Level 3 exhaust valve opening data based on engine brake torque request. By checking the model fitting residuals, the structure of the empirical model can be defined as:

$$R_{ExhVlv}(\omega, t_{Vlv}, L) = \alpha_1^L \cdot \frac{\omega_e}{100} + \alpha_2^L \cdot \left(\frac{\omega_e}{100}\right)^2 + \alpha_3^L \cdot \frac{\omega_e}{100} \cdot t_{Vlv} + \alpha_4^L \cdot t_{Vlv} + \alpha_5^L \cdot t_{Vlv}^2 + \alpha_6^L \quad \text{Eq. (1)}$$

Figure 4:
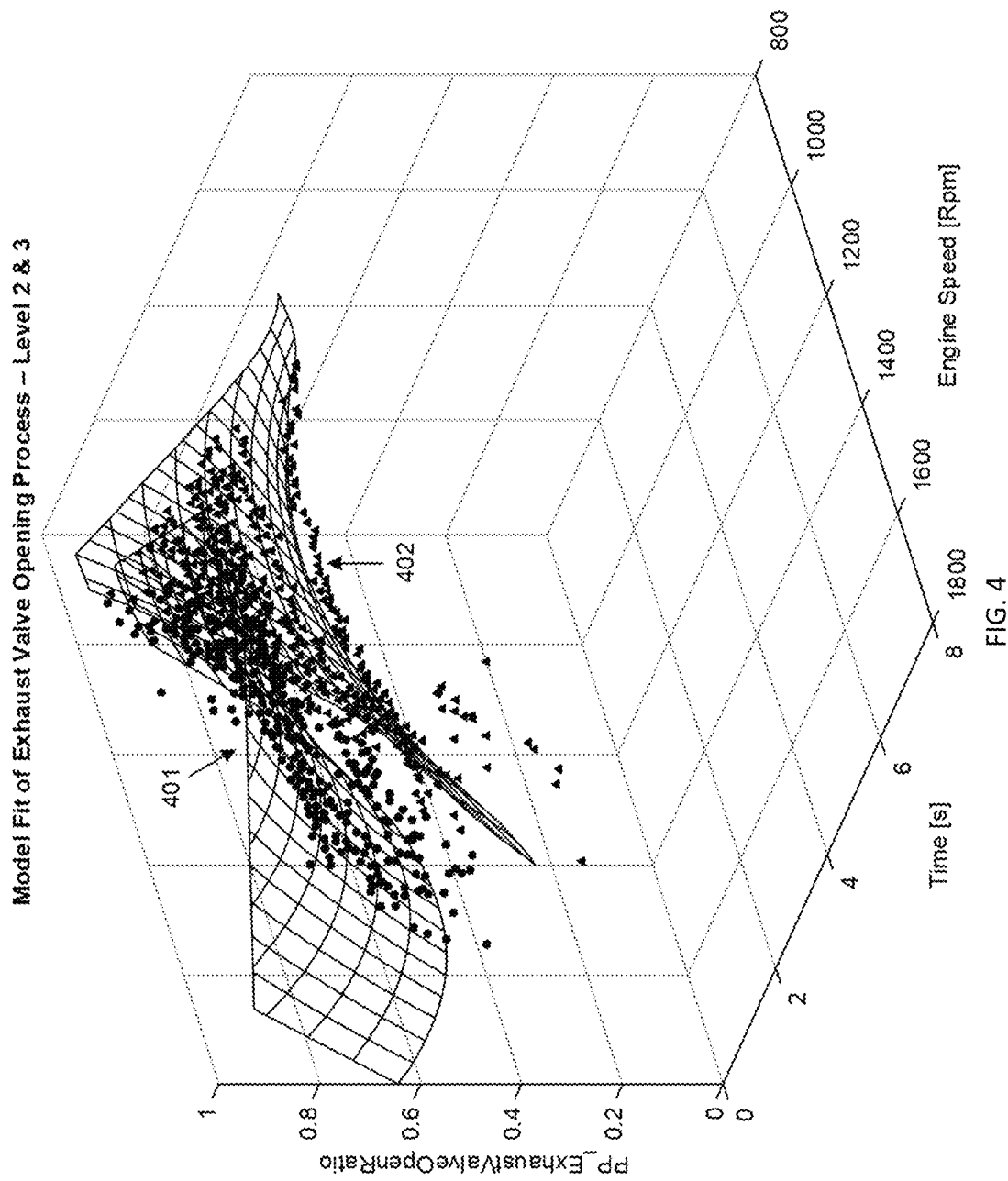
FIG. 4 illustrates an example model of exhaust valve opening for engine brake torque generation in accordance with the present technology.

FIG. 4 illustrates an example model of exhaust valve opening in accordance with the present technology. In this example, engine speed input in Revolutions Per Minute (RPM) unit is scaled by 1/100 and the exhaust valve opening time is in seconds. The alpha coefficient sets are fitted separately by data at the two labeled levels Level 2 and Level 3. In some embodiments, the least square fitting problem can be formulated into a constrained optimization problem to balance in between model response physical space rationality and fitting error minimization. Balanced model residual variance can be observed across the input variables' range, as labeled by the dark circles 401 approximating the upper left surface for Level 2 open rate and dark triangles 402 approximating the lower right surface for Level 3 open rate data.

Multiplying the modeled exhaust valve open ratio with the engine brake capacity curve, the instantaneous engine brake torque at an unsaturated state can be estimated. Once the exhaust valve open ratio reaches to 1, the engine brake model can be switched to simple engine brake capacity lookup by engine speed.

Referring back to FIG. 1, as discussed above, to determine whether using engine brake alone is sufficient or the integrated brake mode is needed for safe deceleration, the vehicle deceleration request 103 is converted into an engine torque request 107. The conversion can be performed by the vehicle longitudinal dynamic model 105. Compared to commonly seen longitudinal dynamic models by the sum of offline defined physical factors, in some embodiments, the model can be implemented as a simple online adaptive empirical model for a number of important reasons. First, for heavy-duty trucks, the vehicle's longitudinal dynamic response varies highly by operation regions and environments. The dynamic response is also time variant. To truly reflect the variations, the model structure can be too complicated to be feasible for online estimation. Second, the longitudinal dynamic response physical model may involve too many measurements that are either unavailable or even unfeasible for trucks. For example, vehicle total weight is highly variable by the load of the vehicle. As another example, the transmission efficiency depends on various factors such as the vehicle condition, gear ratios, oil type, and/or oil temperature, which may not be readily available.

Last but not least, applying a limited amount of local data onto a full-scale model makes the model over-defined. Not only the estimation can become tremendously hard to converge, the model's response in the outer range can also become unreliable.

Therefore, a simple estimation-oriented model structure can be selected for online local adaptation. The simplified model can provide reliable estimation results even with a small amount of training data. The model can conveniently use time invariant parameters to approximate a time variant system by performing online local learning. In some embodiments, the forward longitudinal dynamic model can be defined as:

$$\dot{v} = \rho_1 \alpha_1 \gamma(G) T_e + \rho_2 \alpha_2 v^2 + \rho_3 \alpha_3 \theta + \rho_4 \alpha_4 \quad \text{Eq. (2)}$$

Here, $\alpha_i$ are the estimated model parameters, $\rho_i$ are the input magnitude scalers. $\gamma(G)$ represents the gear ratio, $\theta$ is the road grade (in %), and v represents the vehicle wheel speed in meters per second. Note that directly inverting a forward longitudinal dynamic model for engine torque request estimation is undesirable, because the unbounded estimation process is empirical and local. Therefore, a backward longitudinal dynamic model can be customized for the online estimator. The estimated shaft torque from a backward longitudinal dynamic model can be defined as:

$$\hat{T}_s = \mu_1 \beta_1 \cdot \dot{v} + \mu_3 \beta_3 \cdot \theta + \mu_4 \beta_4 \quad \text{Eq. (3)}$$

Here, $\vec{\mu} = [1, 0.001, 0.1, 1]$ represents the input magnitude scaler.

The backward model's road grade term is coupled with engine torque response. When there is insufficient excitation on grade input, such as driving on a long flat highway route, model covariance may generate poor results. Therefore, when it is determined from the map that there is no sufficient road grade on route, the grade term can be frozen to a nominal value assuming perfect grade information. The model then can be reduced into a three-variable adaptation model accordingly:

$$\hat{T}_s = \mu_1 \beta_1 \cdot \dot{v} + \mu_2 \beta_2 \cdot v^2 - \frac{\mu_1 \beta_1 \alpha_3}{\mu_3} \mu_3 \cdot \theta + \mu_4 \beta_4 \quad \text{Eq. (4)}$$

In many cases, the response properties of the truck can be time-variant. For example, fuel level, tire pressure, transmission temperature, and/or surface frictions can all vary within a period of time. In an offline model, these properties may not be measured properly and thus cannot be modeled accurately. An online adaptive model can thus be used to adapt to these properties. In some embodiments, the online adaptive model 105 as shown in FIG. 1 can be implemented using an online linear regression method so that a time-variant and/or high-order system can be approximated by a time-invariant and/or low-order model via local adaptation.

In some embodiments, the Recursive Least Square (RLS) method can be used to implement the adaptive model. The method performs online updates recursively with respect to data inputs in time sequence. An unconstrained RLS with exponential forgetting rate can be implemented as follows:

$$y_k = \varphi_k^T \theta_k + e_k \quad \text{Eq. (5)}$$

$$\theta_k = \theta_{k-1} + \frac{P_{k-1} \varphi_k}{F + \varphi_k^T P_{k-1} \varphi_k} \left(y_k - \varphi_k^T \theta_{k-1}\right) \quad \text{Eq. (6)}$$

-continued $$P_k = \frac{P_{k-1}}{F} - \frac{P_{k-1}\varphi_k\varphi_k^T P_{k-1}}{F(F + \varphi_k^T P_{k-1}\varphi_k)} \qquad \text{Eq. (7)}$$

Here, k refers to the discrete update step. θk refers to the estimated model coefficients at the kth update, which is the online cost function at step k. $\varphi_k$ refers to the regressor filled with model inputs, $y_k$ refers to the true modeled system's output, and $\varphi_k$ is the model fitting error at the kth step. $P_k$ is the covariance matrix that remembers the model coefficient correlation for a time depth. Here, the cost function of the RLS method can be modified to forget old data with a fading weight. F is the forgetting factor that defines the memory depth, which consequently defines the time invariance length that estimated model is calibrated for. The model coefficients can also be initialized using the common values from offline estimation.

The model can adapt when the operation data follows the scenarios that the model is defined for. Otherwise, the actual regression data into the RLS is not linear (may not even be smooth), and the data can skew the covariance matrix. Furthermore, because the RLS has a memory effect the skewed covariance may not recover in time. RLS can be updated when the data fits the conditions that are determined specifically for autonomous vehicles. When the adaptation conditions are not satisfied, the model parameters and RLS covariance remain at constant values. The conditions include gear shift intervals, large clutch slip, foundation brake usage, large tractor-trailer articulation angle, etc. For additional failure prevention, RLS covariance reset can be performed when the model error has been large or model parameters has been violating physical meanings for a significant amount of time. To make the reset condition only react to non-trivial error signals, an Exponential Weighted Moving Average (EWMA) filter can be applied to the RLS error and used for triggering signal, of which the reset threshold is calibratable.

$$\underline{e_k} = (1-\delta)e_{k-1} + \delta \cdot e_k \qquad \text{Eq. (8)}$$

Figure 5:
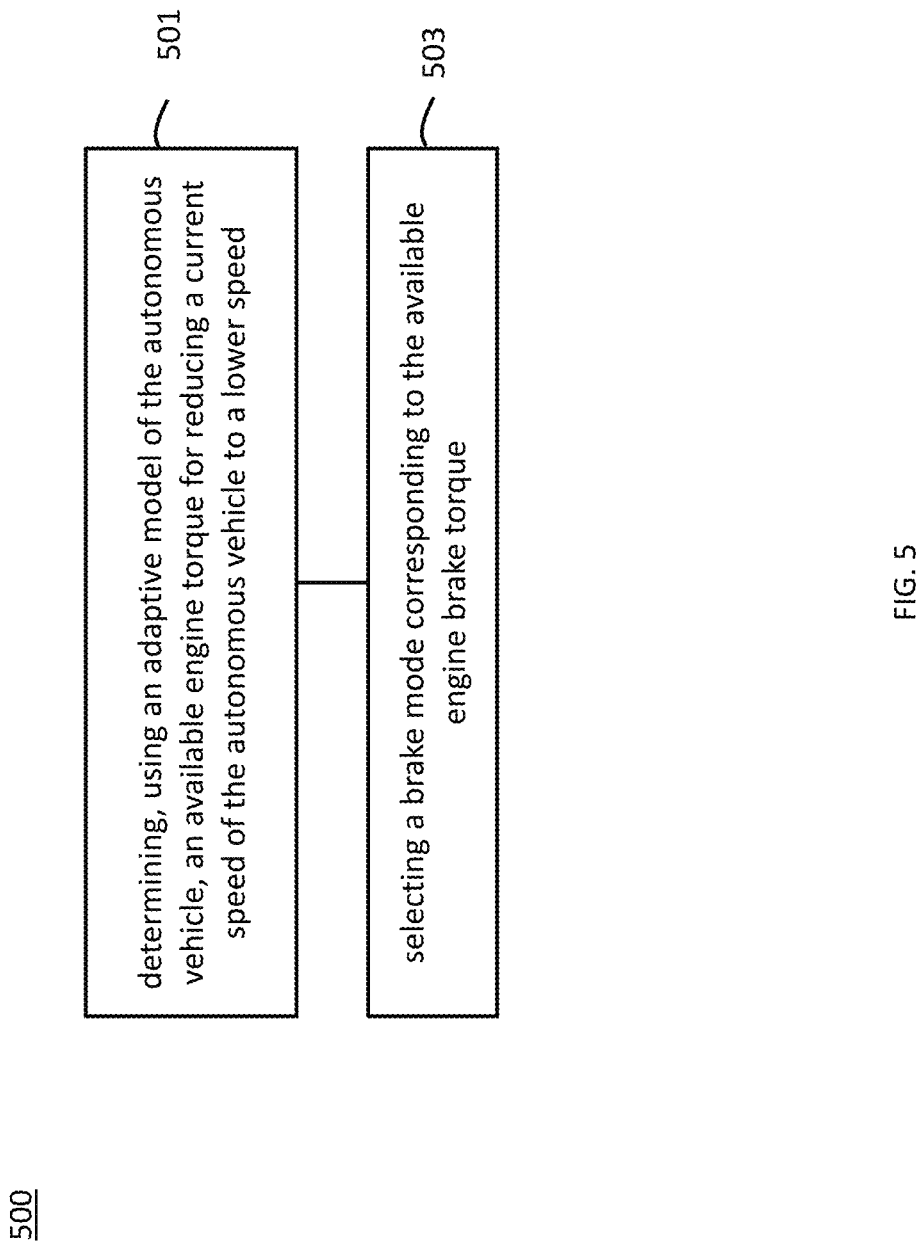
FIG. 5 is a flowchart representation of a method of controlling an autonomous vehicle in accordance with the present technology.

FIG. 5 is a flowchart representation of a method 500 of controlling an autonomous vehicle in accordance with the present technology. The method 500 includes, at operation 501, determining, using an adaptive model of the autonomous vehicle, an available engine brake torque for reducing a current speed of the autonomous vehicle to a lower speed. The method 500 includes, at operation 503, selecting a brake mode corresponding to the available engine brake torque. In case a rate of speed reduction is equal to or smaller than a threshold, the brake mode includes only an engine brake in which engine exhaust valve opening is adjusted to generate the required brake torque for reducing the current speed. The threshold determined in part based on the available engine brake torque. In case the rate of speed reduction is greater than the threshold, the brake mode incudes a combination of the engine brake and the foundation brake.

In some embodiments, the method includes receiving a deceleration request for reducing the current speed of the autonomous vehicle to the lower speed and converting, based on measurements of the autonomous vehicle, the deceleration request to a request with respect to an engine brake torque. In some embodiments, converting the deceleration request includes determining the engine brake torque by generating an engine brake torque capacity model. In some embodiments, the engine brake torque capacity model is generated based on data collected when an adjustment of the engine exhaust valve opening is electronically requested.

In some embodiments, converting the deceleration request includes generating an exhaust valve opening model to approximate the available engine brake torque. In some embodiments, the deceleration request is converted based on a longitudinal dynamic model of the autonomous vehicle. The longitudinal dynamic model can be implemented using online adaptive parameters of the autonomous vehicle. In some embodiments, the longitudinal dynamic model is generated based on at least an engine torque or a vehicle wheel speed. In some embodiments, the adaptive model uses model parameters that are modified based on a cost function during operation of the autonomous vehicle.

Figure 6:
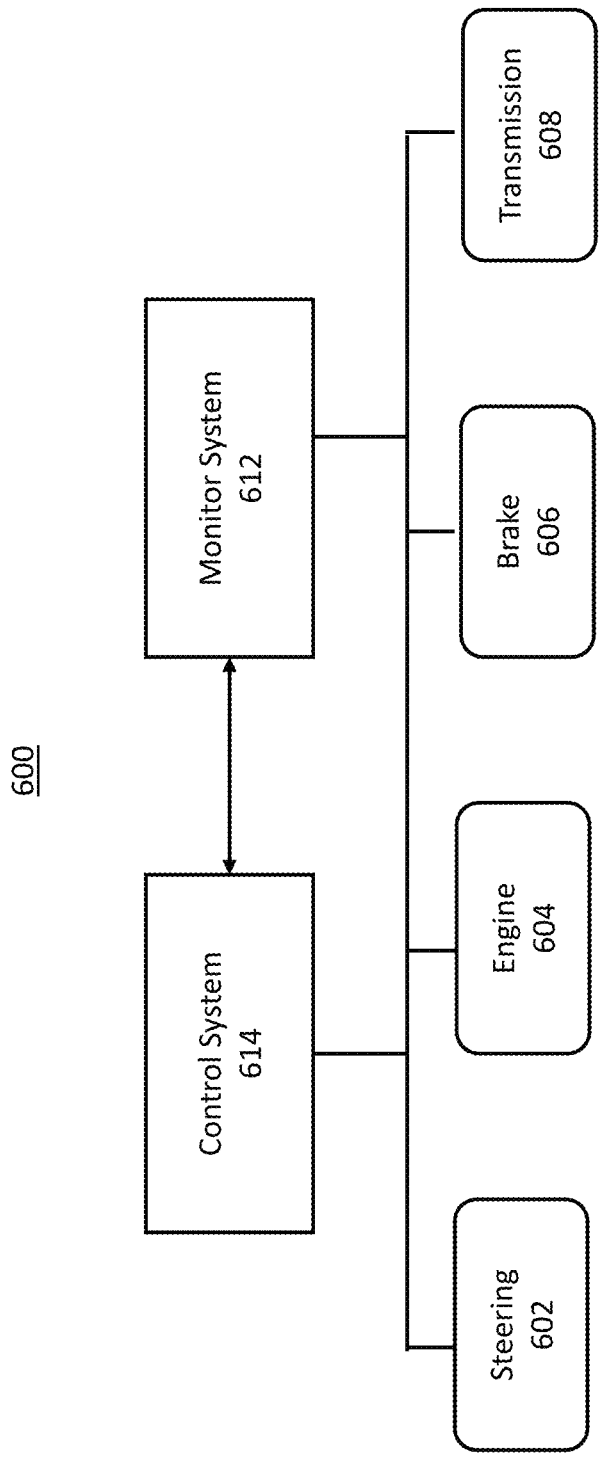
FIG. 6 is a schematic diagram of an autonomous driving vehicle in accordance with the present technology.

FIG. 6 is a schematic diagram of an autonomous driving vehicle 600 in accordance with the present technology. The vehicle includes at least the steering system 602, the engine 604, the brake system 606, and the transmission system 608. To enable autonomous driving, the vehicle 600 also includes a monitor system 612 that monitors and measures the states of the vehicle and a control system 614 that controls various components (e.g., the steering system 602, the engine 604, the brake system 606, and the transmission system 608) based on the measurements. In particular, the brake system 606 can use one or more different brake modes to reduce the current speed of the vehicle. The control system includes a processor that is configured to determine, using an adaptive model of the autonomous vehicle that adaptively adjusts model parameters while the autonomous vehicle is in operation, an available engine brake torque for reducing a current speed of the autonomous vehicle to a lower speed. The processor is configured to select a brake mode corresponding to the available engine brake torque and a rate of speed reduction. In case that the rate of speed reduction is equal to or smaller than a threshold, the brake mode is an engine brake in which engine exhaust valve opening is adjusted to generate a brake torque for reducing the current speed. The threshold can be determined in part based on the available engine brake torque. In case the rate of speed reduction is greater than the threshold, the brake mode includes a combination of the engine brake and a foundation brake.

In some embodiments, the processor is configured to receive a deceleration request for reducing the current speed of the autonomous vehicle to the lower speed and convert, based on the measured vehicle states, the deceleration request to a request with respect to an engine brake torque. In some embodiments, the processor is further configured to determine the engine brake torque based on an engine brake torque capacity model. In some embodiments, the engine brake torque capacity model is determined based on data collected when an adjustment of the engine brake torque is electronically requested.

In some embodiments, the transmission system 608 is in communication with the control system 614. The processor of the control system is configured to generate the brake torque based on a determination that the transmission system is not engaged in a gear shift.

In some embodiments, the processor is configured to approximate the available engine brake torque based on an exhaust valve opening model. In some embodiments, the exhaust valve opening model is generated based on empirical fitting of data from one or more exhaust valves. In some embodiments, the deceleration request is converted based on parameters of the autonomous vehicle that stay invariant over a length of time. In some embodiments, the adaptive model comprises model parameters that are modified during operation of the autonomous vehicle based on a cost function, the cost function comprising a factor indicating the length of time in which the parameters of the autonomous vehicle stay invariant.

In yet another example aspect, a non-transitory computer readable storage medium, storing computer readable instructions is disclosed. The computer readable storage medium is configured to perform a method that includes determining, using an adaptive model of the autonomous vehicle that adaptively adjusts model parameters while the autonomous vehicle is in operation, an available engine brake torque for reducing a current speed of the autonomous vehicle to a lower speed; and selecting a brake mode corresponding to the available engine brake torque and a rate of speed reduction. In case that the rate of speed reduction is equal to or smaller than a threshold, the brake mode is an engine brake in which engine exhaust valve opening is adjusted to generate a brake torque for reducing the current speed. The threshold can be determined in part based on the available engine brake torque. In case the rate of speed reduction is greater than the threshold, the brake mode is a combination of the engine brake and a foundation brake.

In some embodiments, the method comprises converting, based on measurements of the autonomous vehicle, a deceleration request for reducing the current speed of the autonomous vehicle to the lower speed to a request with respect to an engine brake torque. In some embodiments, the engine brake torque is associated with at least a driving speed or a powertrain state. In some embodiments, the deceleration request is converted based on a longitudinal dynamic model of the autonomous vehicle. In some embodiments, the longitudinal dynamic model is implemented using online adaptive parameters of the autonomous vehicle.

In some embodiments, the method comprises approximating the available engine brake torque based on an exhaust valve opening model. In some embodiments, the adaptive model uses model parameters that are modified during operation of the autonomous vehicle based on a Recursive Least Square method. In some embodiments, an Exponential Weighted Moving Average (EWMA) filter is applied to an error of the Recursive Least Square method for adaptation reset triggering.

The foregoing discussions demonstrate that the techniques disclosed herein can calculate the instantaneous engine brake torque availability true to the engine states (e.g., engine speed, exhaust valve timing change, number of active cylinders, etc.). The techniques can also estimate the acceleration/deceleration response properties in real time according to parameters such as the vehicle speed, total mass change, road grade, friction condition, transmission efficiency, etc. Therefore, using the disclosed techniques, vehicle wheel deceleration availability can be accurately estimated to allow proper selection of the braking mechanism. As compared to conventional approaches that typically perform a torque-to-acceleration conversion using an offline vehicle model, in which the accuracy is highly vulnerable to internal and external disturbances and condition changes, the online vehicle engine torque response estimation method takes disturbance and variation factors into account through empirical data, thereby achieving a balance between model accuracy and computation complexity through local learning.

From the foregoing, it will be appreciated that specific embodiments of the presently disclosed technology have been described herein for purposes of illustration, but that various modifications may be made without deviating from the scope of the invention. Accordingly, the presently disclosed technology is not limited, except as by the appended claims.

The disclosed and other embodiments, modules, and the functional operations described in this document, for example, the monitor system and the control system, can be implemented in digital electronic circuitry, or in computer software, firmware, or hardware, including the structures disclosed in this document and their structural equivalents, or in combinations of one or more of them. The disclosed technology and other embodiments can be implemented as one or more computer program products, for example, one or more modules of computer program instructions encoded on a computer readable medium for execution by, or to control the operation of, a data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data include all forms of non-volatile memory, media, and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements, and variations can be made based on what is described and illustrated in this patent document.

What is claimed is:

1. A method of controlling a diesel-engine autonomous vehicle, comprising:
    determining, using an adaptive model of the autonomous vehicle that adaptively adjusts model parameters while the autonomous vehicle is in operation:
        (i) longitudinal dynamic response properties of the autonomous vehicle that indicate a dynamic response of the autonomous vehicle to longitudinal forces, and
        (ii) an available engine brake torque for reducing a current speed of the autonomous vehicle to a lower speed,
        wherein the adaptive model adaptively adjusts the model parameters for the determining the longitudinal dynamic response properties and the available engine brake torque by an online linear regression method that approximates a time-variant or high-order system by a time-invariant or a low-order model; and
    selecting a brake mode corresponding to the available engine brake torque and a rate of speed reduction,
        wherein, in case that the rate of speed reduction is equal to or smaller than a threshold, the brake mode is an engine brake in which engine exhaust valve opening is adjusted to generate a brake torque for reducing the current speed, the threshold determined in part based on the available engine brake torque and the longitudinal dynamic response properties of the autonomous vehicle, and
        wherein the brake mode is a combination of the engine brake and a foundation brake in case the rate of speed reduction is greater than the threshold.

2. The method of claim 1, comprising:
    receiving a deceleration request for reducing the current speed of the autonomous vehicle to the lower speed; and
    converting, based on measurements of the autonomous vehicle, the deceleration request to a request with respect to an engine brake torque.

3. The method of claim 2, wherein converting the deceleration request comprises:
    determining the engine brake torque by generating an engine brake torque capacity model.

4. The method of claim 3, wherein the engine brake torque capacity model is generated based on data collected when an adjustment of the engine exhaust valve opening is electronically requested.

5. The method of claim 2, wherein converting the deceleration request comprises:
    generating an exhaust valve opening model to approximate the available engine brake torque.

6. The method of claim 2, wherein the deceleration request is converted based on a longitudinal dynamic model of the autonomous vehicle that is generated based on at least an engine torque or a vehicle wheel speed.

7. The method of claim 1, wherein the adaptive model uses model parameters that are modified based on a cost function during operation of the autonomous vehicle.

8. An autonomous vehicle, comprising:
    a monitor system configured to measure vehicle states of the autonomous vehicle,
    a transmission system, and
    a control system in communication with the transmission system and in communication with the monitor system to receive the measured vehicle states, the control system including a processor that is configured to:
        determine, using an adaptive model of the autonomous vehicle that adaptively adjusts model parameters while the autonomous vehicle is in operation, an available engine brake torque for reducing a current speed of the autonomous vehicle to a lower speed,
            wherein the adaptive model adaptively adjusts the model parameters for the determining the available engine brake torque by an online linear regression method that approximates a time-variant or high-order system by a time-invariant or a low-order model, and
            wherein the model parameters of the adaptive model are modified during operation of the autonomous vehicle based on a cost function, the cost function comprising a factor indicating a length of time in which parameters of the autonomous vehicle stay invariant; and
        select a brake mode corresponding to the available engine brake torque and a rate of speed reduction,
            wherein, in case that the rate of speed reduction is equal to or smaller than a threshold, the brake mode is an engine brake in which engine exhaust valve opening is adjusted to generate a brake torque for reducing the current speed, the threshold determined in part based on the available engine brake torque, and wherein the brake mode includes a combination of the engine brake and a foundation brake in case the rate of speed reduction is greater than the threshold; and generate the brake torque when the transmission system is not engaged in a gear shift, wherein the rate of speed reduction is converted to the generated brake torque based on the parameters of the autonomous vehicle that stay invariant over the length of time.

9. The vehicle of claim 8, wherein the processor is further configured to:
approximate the available engine brake torque based on an exhaust valve opening model.

10. The vehicle of claim 9, wherein the exhaust valve opening model is generated based on empirical fitting of data from one or more exhaust valves.

11. A non-transitory computer readable storage medium, storing computer readable instructions configured to perform a method that comprises:
determining, using an adaptive model of an autonomous vehicle that adaptively adjusts model parameters while the autonomous vehicle is in operation:
(i) longitudinal dynamic response properties of the autonomous vehicle that indicate a dynamic response of the autonomous vehicle to longitudinal forces, and
(ii) an available engine brake torque for reducing a current speed of the autonomous vehicle to a lower speed,
wherein the adaptive model adaptively adjusts the model parameters for the determining the longitudinal dynamic response properties and the available engine brake torque by an online linear regression method that approximates a time-variant or high-order system by a time-invariant or a low-order model; and
selecting a brake mode corresponding to the available engine brake torque and a rate of speed reduction, wherein, in case that the rate of speed reduction is equal to or smaller than a threshold, the brake mode is an engine brake in which engine exhaust valve opening is adjusted to generate a brake torque for reducing the current speed, the threshold determined in part based on the available engine brake torque and the longitudinal dynamic response properties of the autonomous vehicle, and wherein the brake mode is a combination of the engine brake and a foundation brake in case the rate of speed reduction is greater than the threshold.

12. The non-transitory computer readable storage medium of claim 11, wherein the method comprises:
converting, based on measurements of the autonomous vehicle, a deceleration request for reducing the current speed of the autonomous vehicle to the lower speed to a request with respect to an engine brake torque.

13. The non-transitory computer readable storage medium of claim 12, wherein the engine brake torque is associated with at least a driving speed or a powertrain state.

14. The non-transitory computer readable storage medium of claim 12, wherein the deceleration request is converted based on a longitudinal dynamic model of the autonomous vehicle.

15. The non-transitory computer readable storage medium of claim 14, wherein the longitudinal dynamic model is implemented using online adaptive parameters of the autonomous vehicle.

16. The non-transitory computer readable storage medium of claim 11, wherein the adaptive model uses model parameters that are modified during operation of the autonomous vehicle based on a Recursive Least Square method.

17. The non-transitory computer readable storage medium of claim 16, wherein an Exponential Weighted Moving Average (EWMA) filter is applied to an error of the Recursive Least Square method for adaptation reset triggering.

* * * * *